United States Patent
Sable et al.

(10) Patent No.: US 12,264,849 B2
(45) Date of Patent: Apr. 1, 2025

(54) SOLAR MODULE CLAMP

(71) Applicant: Nextracker LLC, Fremont, CA (US)

(72) Inventors: Abhimanyu Sable, Hyderabad (IN);
Phani Kumar, Hyderabad (IN);
Jitendra Morankar, Telangana (IN)

(73) Assignee: NEXTRACKER LLC, Fremont, CA (US)

( * ) Notice: Subject to any disclaimer, the term of this patent is extended or adjusted under 35 U.S.C. 154(b) by 245 days.

(21) Appl. No.: 17/856,472

(22) Filed: Jul. 1, 2022

(65) Prior Publication Data
US 2023/0009592 A1    Jan. 12, 2023

Related U.S. Application Data

(60) Provisional application No. 63/219,389, filed on Jul. 8, 2021.

(51) Int. Cl.
*F24S 25/634* (2018.01)
*F24S 25/60* (2018.01)

(52) U.S. Cl.
CPC ..... *F24S 25/634* (2018.05); *F24S 2025/6003* (2018.05)

(58) Field of Classification Search
CPC .......... H02S 20/30; H02S 30/10; H02S 30/20; F24S 25/60; F24S 25/63; F24S 25/67; F24S 25/632; F24S 25/634; F24S 25/636; F24S 2025/6003
USPC .................................. 211/13.1; 136/243–265
See application file for complete search history.

(56) References Cited

U.S. PATENT DOCUMENTS

| | | | | |
|---|---|---|---|---|
| 1,832,315 | A * | 11/1931 | McNulty | F16L 3/24 |
| | | | | 248/62 |
| 9,276,521 | B2 * | 3/2016 | Reed | F24S 25/65 |
| 9,281,778 | B2 * | 3/2016 | Corio | F24S 25/636 |
| 9,893,677 | B1 * | 2/2018 | Liu | H02S 20/23 |
| 10,587,216 | B2 | 3/2020 | Almy et al. | |
| 10,797,635 | B2 * | 10/2020 | Watson | H02S 30/10 |
| 2011/0253190 | A1 * | 10/2011 | Farnham, Jr. | F24S 25/636 |
| | | | | 248/214 |
| 2017/0250648 | A1 * | 8/2017 | Haas | F24S 25/65 |

(Continued)

FOREIGN PATENT DOCUMENTS

| | | |
|---|---|---|
| AU | 2020101469 A4 | 8/2020 |
| CN | 111342751 A * | 6/2020 ............. H02S 20/30 |

OTHER PUBLICATIONS

PCT Search Report and Written Opinion issued in PCT Application PCT/2022/035973 dated Oct. 11, 2022.

*Primary Examiner* — Joshua E Rodden
(74) *Attorney, Agent, or Firm* — Fredrikson & Byron, P.A.

(57) ABSTRACT

A clamp assembly for use with a solar module includes a first clamping arm operably coupled to a first portion of a solar module, a second clamping arm operably coupled to a second portion of the solar module and operably coupled to the first clamping arm and disposed in juxtaposed relation thereto, and a fastener operably coupled to a respective portion of each of the first and second clamping arms. The fastener is configured to draw each of the first and second clamping arms towards one another from a first, open position, where the solar module is free to move relative to first and second clamping arms to a second, closed position, where the solar module is inhibited from moving relative to the first and second clamping arms.

14 Claims, 5 Drawing Sheets

(56) References Cited

U.S. PATENT DOCUMENTS

| | | | |
|---|---|---|---|
| 2017/0359017 A1* | 12/2017 | Corio | F16M 11/18 |
| 2020/0153382 A1* | 5/2020 | Ballentine | F24S 25/636 |
| 2020/0373882 A1* | 11/2020 | Watson | H02S 20/30 |
| 2021/0159849 A1* | 5/2021 | Corio | F16M 11/10 |
| 2021/0180832 A1* | 6/2021 | Schuknecht | F16B 2/06 |
| 2021/0351738 A1* | 11/2021 | Schuknecht | F16B 5/02 |
| 2022/0149772 A1* | 5/2022 | Watson | F24S 30/425 |
| 2023/0378899 A1* | 11/2023 | Watson | F16B 2/22 |

* cited by examiner

SOLAR MODULE CLAMP

CROSS-REFERENCE TO RELATED APPLICATION

The present application claims the benefit of, and priority to, U.S. Provisional Patent Application Ser. No. 63/219,389, filed on Jul. 8, 2021, the entire content of which is hereby incorporated by reference herein.

BACKGROUND

Technical Field

The present disclosure relates to solar power generation systems, and more particularly, to clamps and clamping systems for securing solar modules to a support structure.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Coupling the numerous solar modules to the support structure requires a significant number of clamps or other mechanisms, each requiring a significant number of fasteners, driving up the cost of manufacturing each mechanism. As can be appreciated, assembling each of these mechanisms and securely tightening each fastener requires an enormous amount of time, contributing to increased cost and longer assembly time. The present disclosure seeks to address the shortcomings of prior tracker systems.

SUMMARY

In accordance with an aspect of the present disclosure, a clamp assembly for use with a solar module includes a first clamping arm operably coupled to a first portion of a solar module, a second clamping arm operably coupled to a second portion of the solar module, the second clamping arm operably coupled to the first clamping arm and disposed in juxtaposed relation thereto, and a fastener operably coupled to a respective portion of each of the first and second clamping arms, wherein the fastener is configured to draw each of the first and second clamping arms towards one another from a first, open position, where the solar module is free to move relative to the first and second clamping arms to a second, closed position, where the solar module is inhibited from moving relative to the first and second clamping arms.

In aspects, the first and second clamping arms may be configured to receive a portion of a torque tube therebetween, wherein the first and second clamping arms are permitted to translate relative to the torque tube when in the first, open position, and are inhibited from translating relative to the torque tube when in the second, closed position.

In certain aspects, the clamp assembly may include a first solar module fastener operably coupled to the first clamping arm at a first end portion and operably coupled to a portion of the solar module at a second, opposite end portion.

In other aspects, the solar module fastener may define a T-shaped profile having a flange defining opposed upper and lower surfaces and a stem disposed on the lower surface of the flange and extending perpendicularly therefrom, wherein the stem terminates at an end portion that is operably coupled to a portion of the first clamping arm.

In certain aspects, the lower surface of the flange may be configured to abut a portion of the solar module and remain parallel therewith.

In aspects, the first clamping arm may define a clamping surface adjacent the first solar module fastener that is configured to selectively engage a portion of the solar module.

In certain aspects, when the first clamping arm is in the first, open position, the clamping surface of the first clamping arm may be oriented such that the solar module is permitted to move relative to the first clamping arm.

In other aspects, when the first clamping arm is in the second, closed position, the clamping surface of the first clamping arm may form an angle relative to the solar module such that the solar module is wedged between the lower surface of the flange of the solar module fastener and the clamping surface of the first clamping arm to inhibit movement of the solar module relative to the first clamping arm.

In aspects, the clamp assembly may include an upper brace interposed between the first and second clamping arms, wherein the upper brace is rotatably coupled to each of the first and second clamping arms such that the first and second clamping arms may rotate relative thereto.

In accordance with another aspect of the present disclosure, a clamp assembly for use with a solar module includes an upper brace defining an elongate member extending between first and second end portions, a first clamping arm rotatably supported by the first and portion of the upper brace, a portion of the first clamping arm operably coupled to a first portion of a solar module, a second clamping arm rotatably supported by the second end portion of the upper brace, a portion of the second clamping arm operably coupled to a second portion of the solar module, and a fastener operably coupled to a respective portion of each of the first and second clamping arms, wherein the fastener is configured to draw each of the first and second clamping arms towards one another from a first, open position, where the solar module is free to move relative to the first and second clamping arms to a second, closed position, where the solar module is inhibited from moving relative to the first and second clamping arms.

In aspects, the clamp assembly may include a first solar module fastener operably coupled to the first clamping arm at a first end portion and operably coupled to a portion of the solar module at a second, opposite end portion.

In certain aspects, the first solar module fastener may define a T-shaped profile having a flange defining opposed upper and lower surfaces and a stem disposed on the lower surface of the flange and extending perpendicularly therefrom, wherein the stem terminates at an end portion that is operably coupled to a portion of the first clamping arm.

In other aspects, the end portion of the stem may include a cylindrical profile, the cylindrical profile of the end portion configured to be received in a corresponding bore defined through a portion of the first clamping arm such that the first solar module fastener is rotatably coupled to the first clamping arm.

In certain aspects, the clamp assembly may include a second solar module fastener operably coupled to the second clamping arm at a first end portion and operably coupled to a portion of the solar module at a second, opposite end portion.

In aspects, the first and second solar module fasteners may cooperate to permit movement of the solar module relative to the first and second clamping arms when the first and second clamping arms are in the first, open position, and inhibit movement of the solar module relative to the first and second clamping arms when the first and second clamping arms are in the second, closed position.

In accordance with another aspect of the present disclosure, a clamp assembly for use with a solar module includes a first clamping arm, a first solar module fastener operably coupled to the first clamping arm, a second clamping arm operably coupled to the first clamping arm, a second solar module fastener operably coupled to the second clamping arm, and a fastener operably coupled to a respective portion of each of the first and second clamping arms, wherein the fastener is configured to draw each of the first and second clamping arms toward one another from a first, open position, where the solar module is free to translate relative to the first and second clamping arms to a second, closed position, where the solar module is inhibited from moving relative to the first and second clamping arms.

In aspects, each of the first and second solar module fasteners may include a T-shaped profile having a flange defining opposed upper and lower surfaces and a stem disposed on the lower surface of the flange and extending perpendicularly therefrom, wherein each respective stem of the first and second solar module fasteners terminates at a respective end portion that is operably coupled to a portion of each respective first and second clamping arm.

In certain aspects, the lower surface of each of the flanges of the first and second solar module fasteners may be configured to abut a portion of the solar module and remain parallel therewith.

In other aspects, each of the first and second clamping arms may define a respective clamping surface adjacent each respective first and second solar module fastener that is configured to selectively engage a portion of the solar module.

In aspects, when the first and second clamping arms are in the first, open position, each respective clamping surface of the first and second clamping arms may be oriented such that the solar module is permitted to translate relative to the first and second clamping arms and when the first and second clamping arms are in the second, closed position, each respective clamping surface of the first and second clamping arms forms an angle relative to the solar module such that the solar module is wedged between each respective lower surface of the first and second solar module fasteners and each respective clamping surface of the first and second clamping arms to inhibit movement of the solar module relative to the first and second clamping arms.

BRIEF DESCRIPTION OF THE DRAWINGS

Various aspects and features of the present disclosure are described hereinbelow with reference to the drawings, wherein.

DETAILED DESCRIPTION

Figure 1:
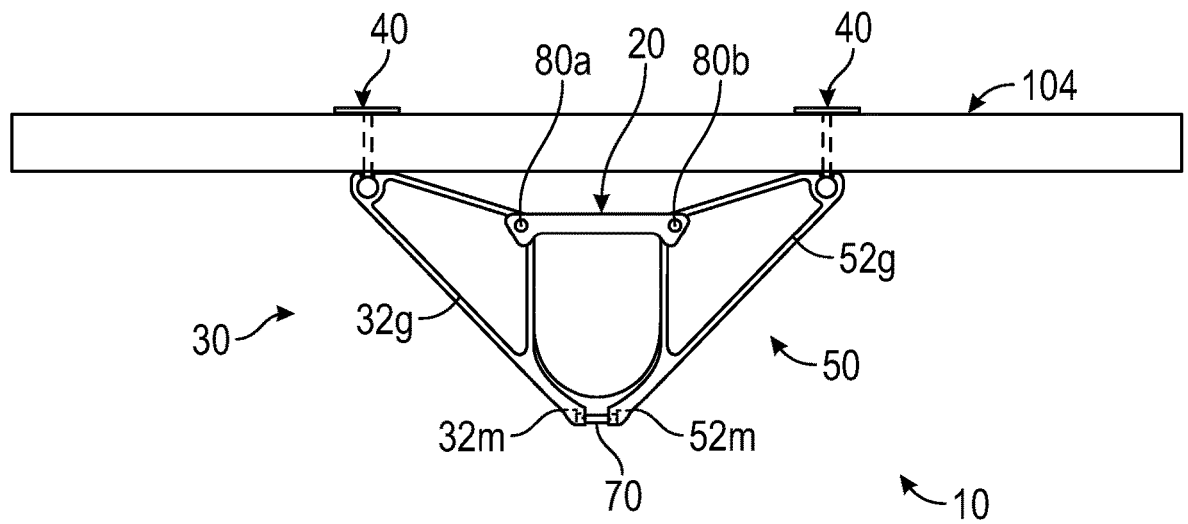
FIG. 1 a front, elevation view of a solar module clamp in accordance with the present disclosure.

The present disclosure is directed to a clamp assembly for use with solar modules of a solar tracking system. The clamp assembly includes an upper brace, a first clamping arm assembly rotatably coupled to the upper brace, a second clamping arm assembly rotatably coupled to the upper brace and in juxtaposed relation to the first clamping arm assembly, and a clamping fastener operably coupled to each of the first and second clamping arm assemblies.

The upper brace includes an elongate body extending between first and second opposed end portions. Each of the first and second opposed end portions includes a bore defined therethrough that is configured to receive a respective hinge pin therein. The hingepin is received through a corresponding borehole within each of the first and second clamping arm assemblies such that the first and second clamping arm assemblies are rotatably coupled to the upper brace via the hingepins. The upper brace defines a pair of protuberances disposed adjacent each respective end portion of the first and second opposed end portions. Each protuberance includes an inner surface that is configured to abut a portion of a torque tube of a solar module tracker such that the upper brace is inhibited from translating laterally relative to the torque tube.

The first and second clamping arm assemblies are substantially similar to one another. The first clamping arm assembly includes a clamping arm and a solar module fastener rotatably coupled thereto. The clamping arm includes a generally scalene triangle profile having first, second, and third side interconnected via corresponding first, second, and third corners. The first and second side surfaces include generally planar profiles and third side surface includes a planar profile adjacent to the second corner and transitions to an arcuate profile adjacent the third corner such that the third side surface includes a profile that generally corresponds to a profile of the torque tube. The first side surface defines a clamping surface adjacent to the first corner that is oriented at an angle relative to the first side surface. The clamping surface is configured to abut a portion of the solar module such that when the clamp assembly is placed in a first, open position, the solar module is permitted to translate relative to the clamp assembly and when the clamp assembly is placed in a second, closed position, the solar module is inhibited from translating relative to the clamp assembly, and thereby, the torque tube.

The clamping arm includes a bore defined therethrough adjacent to the second corner that is configured to rotatably receive the hingepin therein. A borehole is defined through the clamping arm adjacent to the first corner for rotatably receiving a portion of the solar module fastener therein. A slot is defined through the clamping arm and extends through an inner surface of the borehole and the clamping surface and includes a generally trapezoidal profile to accommodate a stem of the solar module fastener.

The clamping arm includes a flange that is formed adjacent the third corner and is configured to be operably coupled to a portion of the clamping fastener. It is contemplated that the clamping fastener is operably coupled to the flange of each clamping arm of the first and second clamping arm assemblies such that as the clamping fastener is actuated in a first direction, the clamping arms are caused to be drawn towards one another to transition from the first, open position, to the second, closed position. As can be appreciated, actuating the clamping fastener in the opposite direction causes the clamping arms to separate and transition from the second, closed position, to the first, open position.

The solar module fastener includes a generally T-shaped profile having an upper flange and a stem extending from a lower surface of the upper flange. An end portion of the stem is configured to be rotatably received within the borehole of the clamping arm adjacent the clamping surface. In this manner, the lower surface of the upper flange and the clamping surface of the clamping arm define a gap therebetween that is configured to slidably receive a portion of the solar module therein when the clamping arms are in the first, open position, and inhibit movement of the solar module relative to the solar module fastener and clamping arm when the clamping arms are in the second, closed position. In this manner, the lower surface of the flange of the solar module fastener remains generally parallel to the solar module while the clamping surface of the clamping arm transitions from a generally parallel angle relative to the solar module to an angle relative to the solar module to wedge or otherwise capture the solar module within the gap formed between the solar module fastener and the clamping surface.

Figure 2:
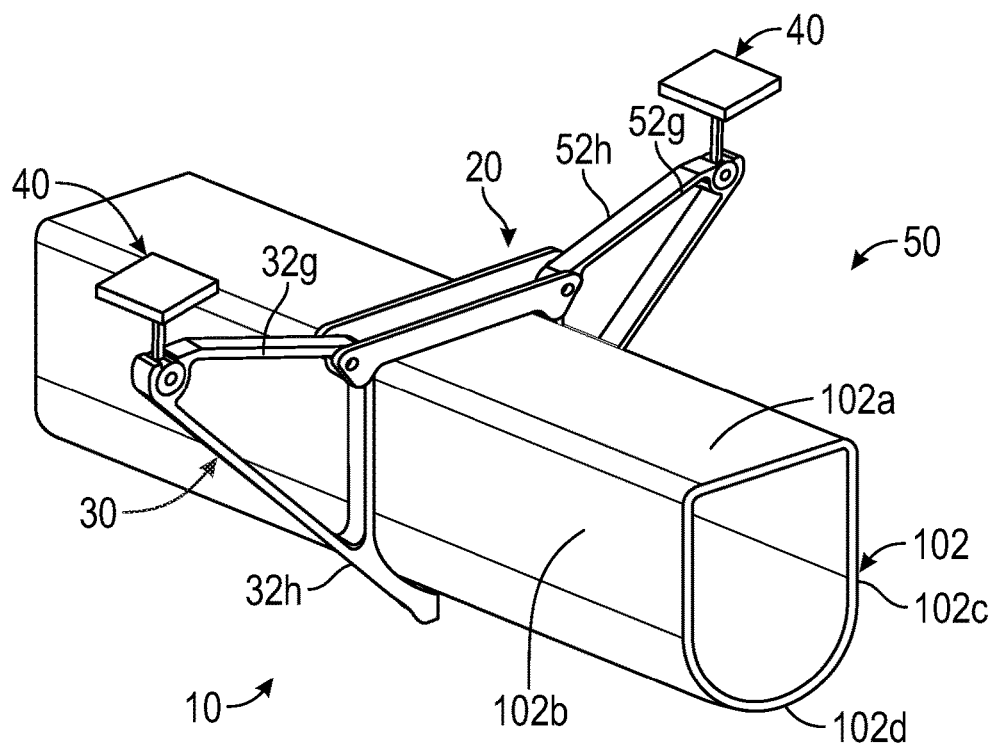
FIG. 2 is a perspective view of the solar module clamp of FIG. 2.

Referring now to the drawings, a clamp assembly for use with a solar module is illustrated and generally identified by reference numeral 10. As illustrated in FIGS. 1 and 2, the clamp assembly 10 includes an upper brace 20, a first clamping arm assembly 30, a second clamping arm assembly 50, and a clamping fastener 70.

Figure 3:
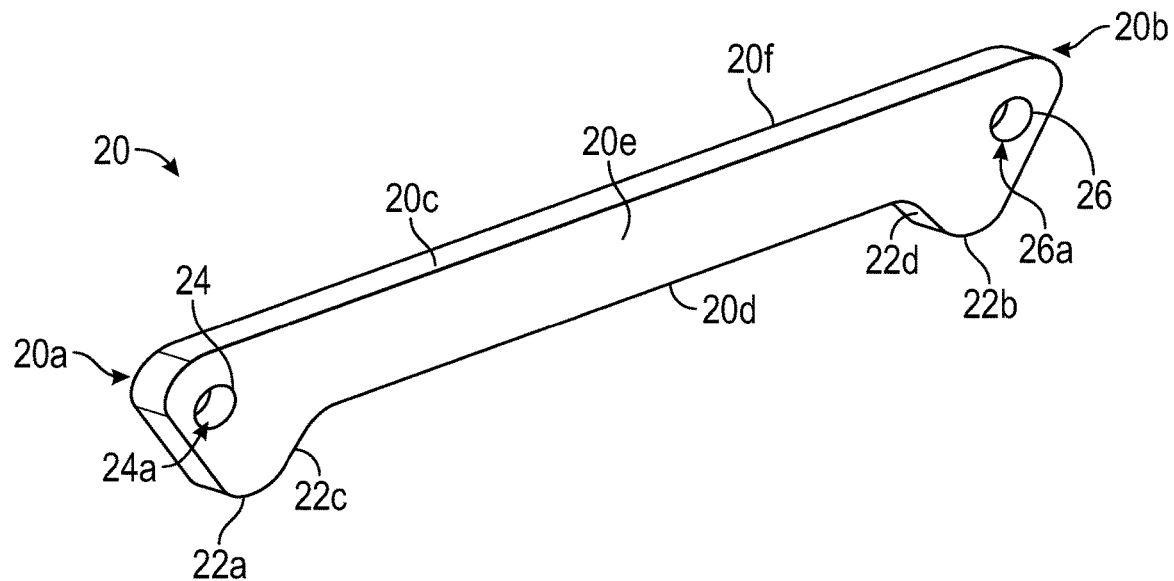
FIG. 3 is a perspective view of an upper brace of the solar module clamp of FIG. 1.

With additional reference to FIG. 3, the upper brace 20 defines an elongate body extending between opposed first and second end portions 20a and 20b, respectively. The upper brace 20 includes opposed upper and lower surfaces 20c and 20d, respectively, extending between each of the first and second end portions 20a, 20b and opposed first and second side surfaces 20e and 20f extending between each of the first and second end portions 20a, 20b and upper and lower surfaces 20c, 20d.

The lower surface 20d includes a pair of protuberances 22a and 22b disposed thereon and extending therefrom. The first protuberance 22a is disposed adjacent to the first end portion 20a and the second protuberance 22b is disposed adjacent to the second end portion 20b. An inner portion 22c and 22d of each of the first and second protuberances 22a, 22b, respectively, is configured to abut a portion of a torque tube 102 (FIG. 2) of a solar tracking system (not shown) such that the upper brace 20 is selectively secured to the torque tube 102 to inhibit movement of the upper brace 20 relative to the torque tube 102. In this manner, a profile defined by each of the inner portions 22c, 22d of the first and second protuberances 22a, 22b and the lower surface 22d is similar to a profile of an upper portion of the torque tube 102 (e.g., a rectangular profile, an oval profile, a circular profile, etc.).

A first inner surface 24 defines a first through bore 24a disposed adjacent the first end portion 20a of the upper brace 20 and extends through respective opposed side surfaces 20e, 20f. A second inner surface 26 defines a second through bore 26a disposed adjacent the second end portion 20b and extends through respective opposed side surfaces 20e, 20f. The first and second through bores 24a, 26b are configured to receive a corresponding pair of hinge pins or fasteners 80a and 80b (FIG. 1) to rotatably couple each respective first and second clamping arm assemblies 30, 50, to the upper brace, as will be described in further detail hereinbelow.

In embodiments, the clamp assembly 10 may include a pair of upper braces 20 disposed in spaced relation to one another (FIG. 2). In this manner, a first upper brace 20 is disposed adjacent a first opposed surface 32g, 52g of the first and second clamping arm assemblies 30, 50 and a second upper brace 20 is disposed adjacent an opposite, second opposed surface 32h, 52h (FIG. 2) of the first and second clamping arm assemblies 30, 50. In embodiments, the pair of upper braces 20 may be coupled to one another by spacer blocks (not shown), standoffs (not shown), amongst others, and may be mechanically fastened to one another (bolts, rivets, welding, etc.), may be bonded to one another (adhesives, epoxies, etc.), or any other method of selectively or permanently inhibiting movement between two components.

Figure 3A:
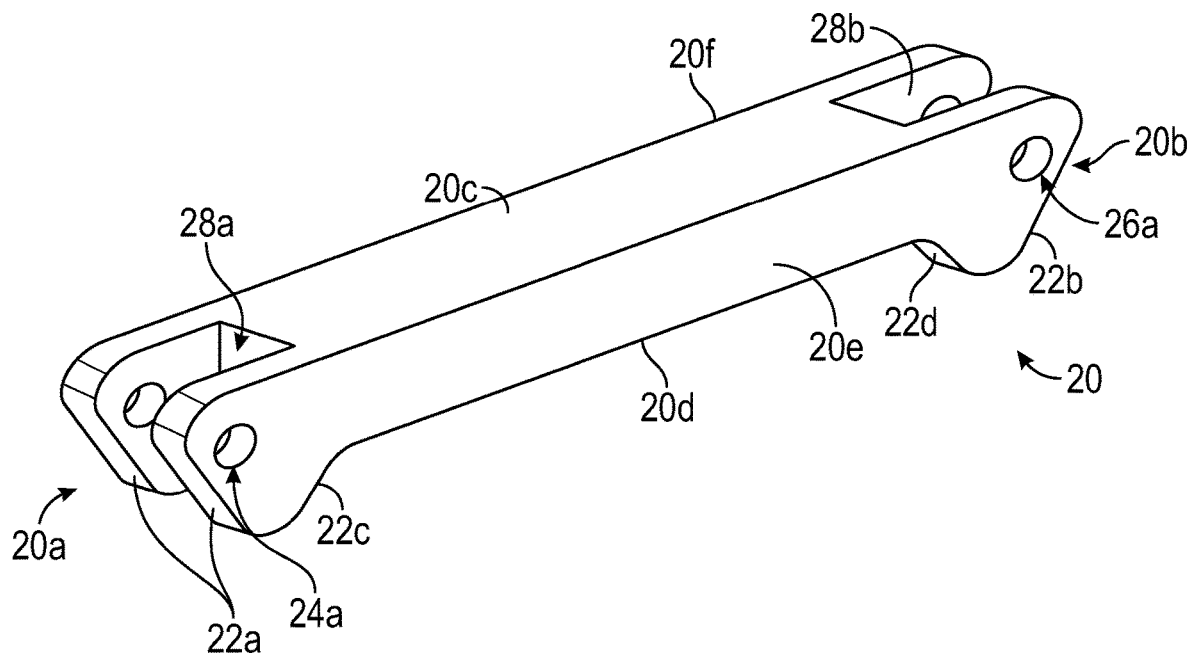
FIG. 3A is a perspective view of another embodiment of the upper brace of FIG. 3.

With reference to FIG. 3A, it is contemplated that the upper brace 20 may be formed monolithically having a pair channels 28a and 28b defined through each respective first and second end portion 20a, 20b and an adjacent portion of the upper and lower surfaces 20c, 20d. As will be appreciated, the pair of channels 28a, 28b is configured to receive a portion of each respective first and second clamping arm assemblies 30, 50 therein such that each of the first and second clamping arm assemblies 30, 50 may freely rotate relative to the upper brace 20, as will be described in further detail hereinbelow.

As can be appreciated, the first and second upper braces 20, or in embodiments, the upper brace 20, in conjunction with the pair of pins 80a, 80b, cooperate to rotatably couple the first and second clamping arm assemblies 30, 50 to the first and second upper braces 20 and inhibit the first and second upper braces 20 from translating axially relative thereto. It is contemplated that the clamp assembly 10 may include a thrust washer (not shown) (metallic, composite, polymer, etc.), thrust bearing (ball, needle, etc.), or the like interposed between the first and second clamping arm assemblies 30, 50 and each of the first and second upper braces 20 to enable the first and second clamping arm assemblies 30, 50 to freely rotate relative to the first and second upper braces 20. In embodiments, the first and second upper braces 20 may include a radial bushing (metallic, composite, polymer, etc.), a radial bearing (ball, needle, etc.), or the like disposed within each of the first and second through bores 24a, 26a or each of the first and second clamping arm assemblies 30, 50 may include a radial bushing (metallic, composite, polymer, etc.), a radial bearing (ball, needle, etc.), or the like disposed within a corresponding portion thereof to enable the first and second clamping arm assemblies 30, 50 to freely rotate relative to the first and second upper braces 20.

Although generally described as being an elongate body, it is contemplated that the upper brace 20 may be a threaded fastener, a turnbuckle, one or more rod ends, amongst others. In embodiments, the clamp assembly 10 may not include an upper brace 20 and rather, the first and second clamping arm assemblies 30, 50 may be operably coupled to one another such that the first and second clamping arm assemblies 30, 50 may rotate relative to one another but not translate relative to one another. In embodiments, the first and second clamping arm assemblies 30, 50 may be rotatably coupled to one another using a hinge pin (e.g., each of the first and second clamping arm assemblies 30, 50 rotate about the same hinge pin) or other suitable means capable of rotatably coupling the first and second clamping arm assemblies 30, 50 to one another.

With reference to FIGS. 1, 2, 4, 4A, and 4B, the first clamping arm assembly 30 is illustrated and includes a clamping arm 32 and a solar module fastener 40. The first and second clamping arm assemblies 30, 50 are substantially similar and therefore, only the first clamping arm assembly 30 will be described in detail herein in the interest of brevity.

The clamping arm 32 defines a generally scalene triangular profile, although it is contemplated that the clamping arm 32 may include any suitable profile, such as rectangular, oval, square, trapezoid, amongst others. The clamping arm 32 defines first, second, and third side surfaces 32a, 32b, and 32c, respectively, which cooperate to define the perimeter of the generally scalene triangular profile of the clamping arm 32. In this manner, the first and second side surfaces 32a, 32b intersect at a first corner 32d, the first and third side surfaces intersect at a second corner 32e, and the second and third side surfaces intersect at a third corner 32f. The clamping arm 32 defines first and second opposed surfaces 32g and 32h, respectively extending between each of the first, second, and third side surfaces 32a, 32b, 32c, respectively.

The first side surface 32a of the clamping arm 32 defines a generally planar profile, although it is contemplated that the first side surface may include any suitable profile, such as convex, concave, sinusoidal, amongst others. The second side surface 32b of the clamping arm defines a generally planar profile and intersects the first side surface 32a at the first corner 32d such that an angle formed between the first and second side surfaces 32a, 32b is an acute angle. Although generally described and illustrated as being planar, it is contemplated that the second side surface may include any suitable profile, such as convex, concave, sinusoidal, amongst others, and may include the same or different profile than that of the first side surface.

The third side surface 32c of the clamping arm 32 defines a profile that generally conforms to the outer surface of the torque tube 102. In this manner, the third side surface 32c defines a generally planar portion 32i adjacent to and extending from the second corner 32e and towards the third corner 32f. The third side surface 32c transitions to an arcuate profile 32j adjacent to the third corner 32f that generally conforms to the arcuate profile of the torque tube 102. As can be appreciated, it is contemplated that the third side surface 32c may include any suitable profile, and in embodiments, conforms to the profile of the torque tube 102, such as oval, rectangular, square, circular, triangular, amongst others, although it is contemplated that the third surface 32c may include any suitable profile capable of clamping against the torque tube and may be the same or different than the outer profile of the torque tube 102.

With reference to FIG. 2, the torque tube 102 defines a generally D-shaped profile having three planar side surfaces 102a, 102b, and 102c, and a semicircular surface 102d joining the second and third side surfaces 102b, 102c and defining the perimeter of the torque tube 102. In this manner, the third surface 32c of the clamping arm 32 may include a profile that is the same or substantially similar to the profile of the torque tube 102 to ensure that when clamped therewithin, the torque tube 102 is inhibited from translating, rotating, or otherwise moving relative to the clamp assembly 10. It is envisioned that the torque tube 102 may include any suitable profile, such as circular, square, rectangular, oval, amongst others, and as described hereinabove, in embodiments, the third side surface 32c of the clamping arm 32 may include a profile that is the same or substantially similar to the profile of the torque tube 102.

Figure 4:
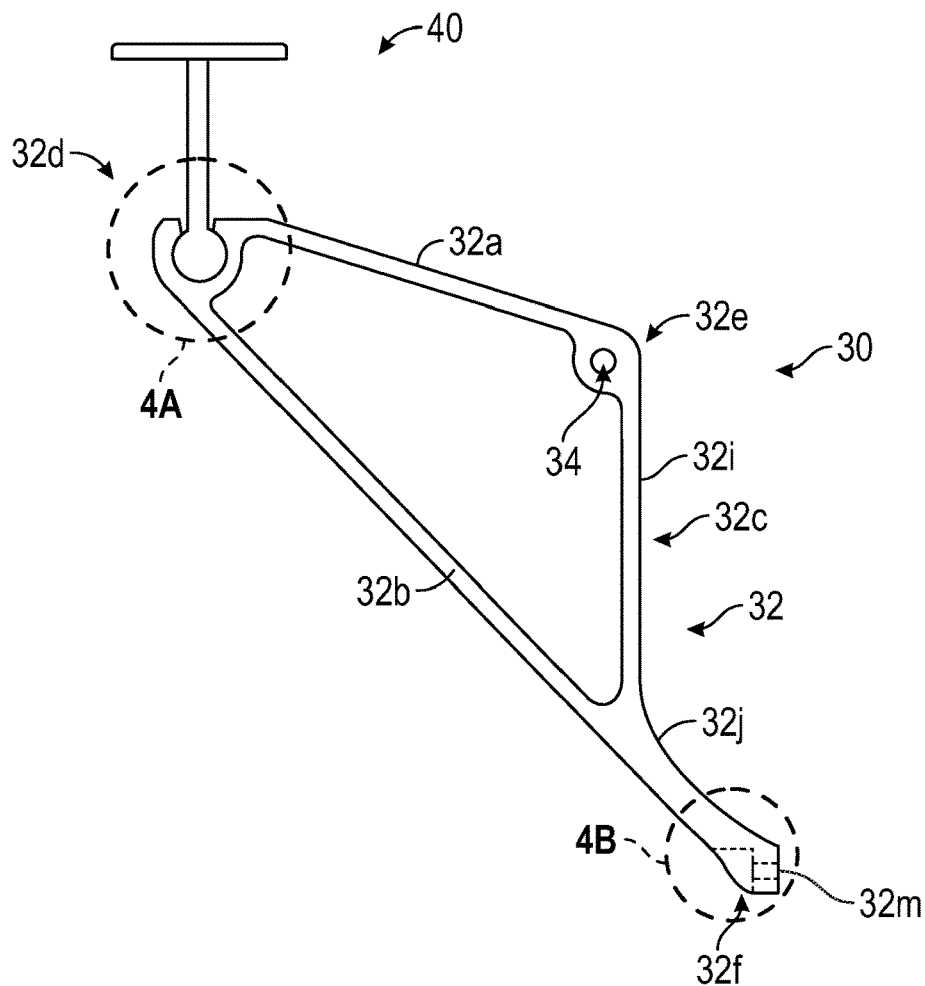
FIG. 4 is a front, elevation view of a clamping arm of the solar module clamp of FIG. 1.

With reference to FIG. 4, the clamping arm 32 includes a bore 34 defined through each of the first and second opposed surfaces 32g, 32h and disposed adjacent the second corner 32e. The bore 34 of the clamping arm 32 is configured to receive a hinge pin 80a (FIG. 1) or other suitable component capable of rotatably coupling the clamping arm 32 to the upper brace 20, such as a fastener (e.g., a bolt, etc.). In this manner, the hinge pin 80a is received within the first through bore 26a of the upper brace 20 and the bore 34 of the clamping arm 32 such that the clamping arm 32 is rotatably coupled to the upper brace 20 and is permitted to rotate about the hinge pin 36.

Figure 4A:
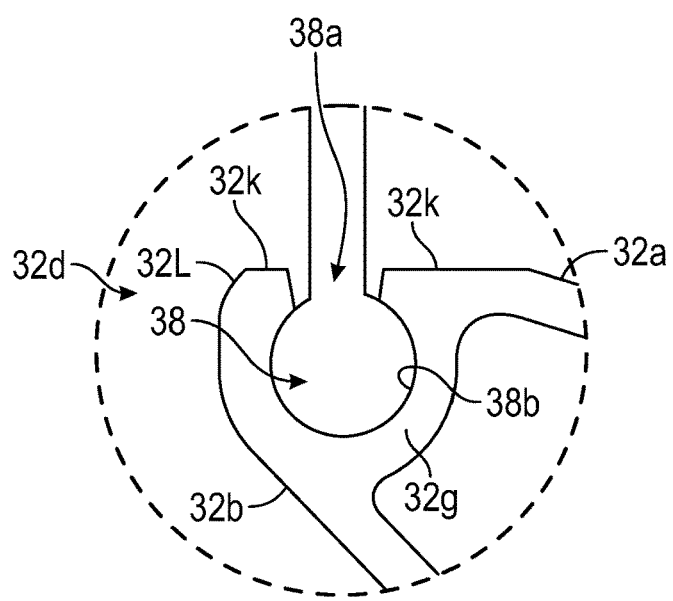
FIG. 4A is an enlarged view of the area of detail indicated in FIG. 4.

With reference to FIG. 4A, the clamping arm 32 includes a borehole 38 defined through each of the first and second opposed surfaces 32g, 32h and disposed adjacent the first corner 32d. The borehole 38 includes a dimension that is configured to rotatably receive a portion of the solar module fastener 40 therein, as will be described in further detail hereinbelow. A portion of the first side surface 32a adjacent to the first corner 32d defines a clamping surface 32k that is oriented at an angle relative to the remaining portion of the first side surface 32a such that a solar module 104 of the solar tracking system (not shown) may freely slide relative to the clamping arm 32 when the clamping arm 32 is in a first, open position (FIGS. 7 and 8), and the solar module 104 is selectively locked relative to the clamping arm 32 when the clamping arm 32 is in a second, closed position (FIG. 9), as will be described in further detail hereinbelow. Although generally illustrated as being uncoated, it is contemplated that the clamping surface 32k may include a coating disposed thereon to enhance the clamping ability of the first clamping arm 32 on the solar module 104, such as a polymer (e.g., rubber, silicone, etc.), metal (aluminum, brass, etc.), composite, amongst others.

The clamping arm 32 includes a slot 38a defined through each of the first and second opposed surfaces 32g, 32h, through a portion of an inner surface 38b of the borehole 38, and through a portion of the clamping surface 32k. The slot 38a defines a generally trapezoidal profile (e.g., having a width that is greater adjacent the clamping surface 32k than a width that is adjacent the inner surface 38b of the borehole 38 to enable the solar module fastener 40 received within the borehole 38 to rotate relative thereto. In embodiments, the clamping arm 32 includes a bevel 32L or other suitable feature (e.g., fillet, chamfer, etc.) adjacent the first corner 32d to enable the clamping arm 32 to freely rotate relative to the solar module 104 when the solar module 104 is received between the clamping arm 32 and a portion of the solar module fastener 40, as will be described in further detail hereinbelow.

Figure 4B:
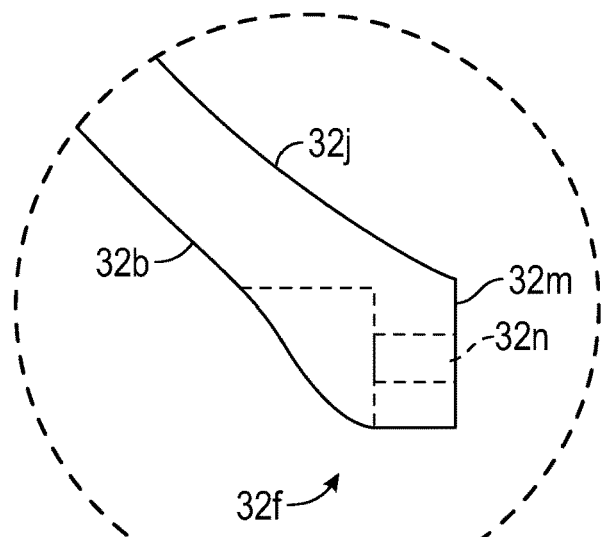
FIG. 4B is an enlarged view of the area of detail indicated in FIG. 4.

Continuing with FIG. 4 and with additional reference to FIG. 4B, the clamping arm 32 includes a flange 32m disposed thereon adjacent the third corner 32f. The flange 32m includes a bore 32n defined therethrough that is configured to receive a portion of the clamping fastener 70 therein (FIG. 1). In this manner, when the clamp assembly 10 is disposed on the torque tube 102, each of the first and second clamping arms 32, 52 is disposed over the torque tube 102 such that the flanges 32m, 52m of each of the first and second clamping arms 32, 52 is disposed in juxtaposed relation to one another. The clamping fastener 70 is received within each bore 32n of respective first and second clamping arms 32, 52, and the clamping fastener 70 is tightened to draw the flanges 32m, 52m towards one another and thereby tightening each respective clamping arm 32, 52 against the torque tube 102.

Although generally described as being a bore, it is contemplated that the bore 32n may be a slot or other feature capable of receiving a portion of the clamping fastener 70 therein. In embodiments, the bore 32n of the first clamping arm and the corresponding bore (not shown) of the second clamping arm may be the same or different depending upon the design needs of the clamp assembly 10. In this manner, the first clamping arm 32 may include a bore 32n and the second clamping arm 52 may include a slot (not shown), or vice versa. In embodiments, one or both of the bores of the first (32n) and second clamping arms may be threaded to threadably receive a portion of the clamping fastener. It is contemplated that the clamping fastener may include a threaded bolt and a barrel nut or other suitable fastener or may be a turnbuckle, amongst others. Although generally described as a flange, it is envisioned that the flanges 32m, 52m may be any suitable feature capable of receiving a fastener or fasteners therein, such as a boss, protuberance, amongst others.

Figure 5:
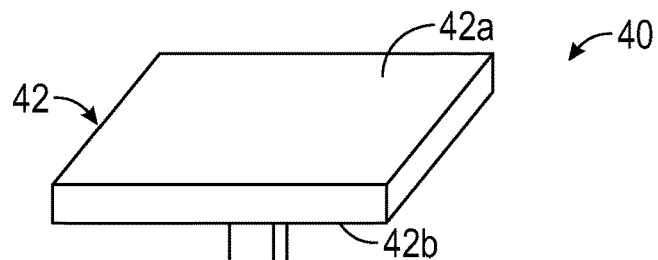
FIG. 5 is a perspective view of a solar module fastener of FIG. 1.
Figure 6:
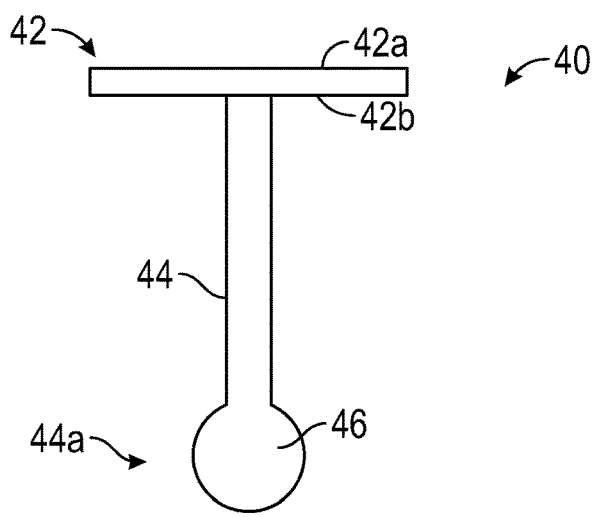
FIG. 6 is a front, elevation view of the solar module fastener of FIG. 5.

With reference to FIGS. 5 and 6, the solar module fastener 40 defines a generally T-shaped profile having an upper flange 42 defining opposed upper and lower surfaces 42a and 42b, respectively. A stem 44 is disposed on a central portion of the lower surface 42b of the upper flange and extends perpendicularly therefrom. A cylindrical key 46 is disposed at an end portion 44a of the stem 44 that is opposite the upper flange 42. The key 46 includes a profile that is similar to the borehole 38 of the first clamping arm 32 such that the key 46 may be slidably received and rotatably supported therein. Although generally described as being cylindrical, it is contemplated that the key 46 may include a spherical profile, or any suitable profile capable of enabling the solar module fastener 40 to rotate relative to the first clamping arm 32. The stem 44 includes a length that defines a gap between the lower surface 42b of the solar module fastener 40 and the clamping surface 32k of the first clamping arm 32 such that the solar module 104 may be slidably received therebetween when the clamping arm 32 is in a first, open position (FIG. 7).

Figure 7:
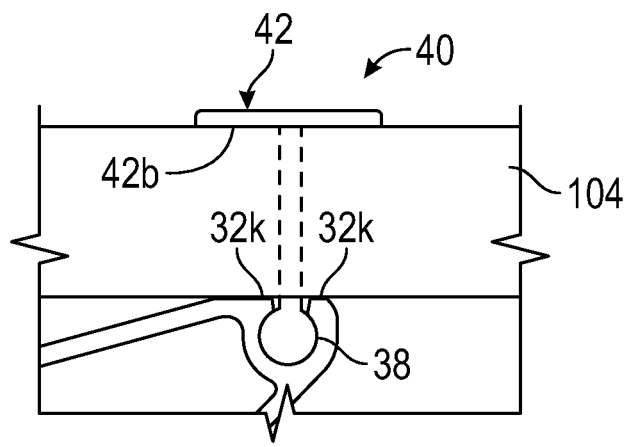
FIG. 7 is a front, elevation view of a portion of the solar module clamp of FIG. 1 placed in an open configuration.
Figure 8:
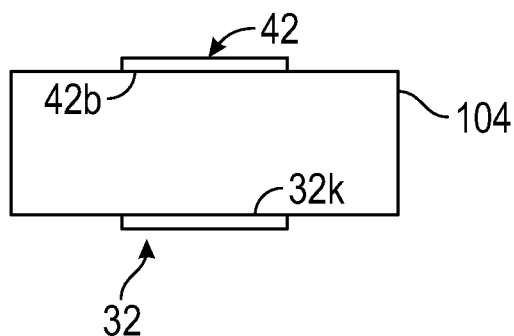
FIG. 8 is a schematic view of the solar module clamp of FIG. 1 placed in the open configuration.
Figure 9:
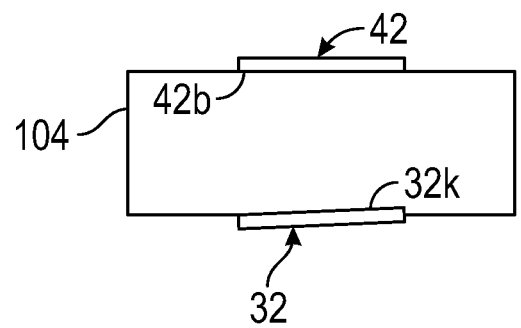
FIG. 9 is a schematic view of the solar module clamp of FIG. 1 placed in a closed configuration.

With reference to FIGS. 7-9, in operation, when the clamping system 10 is in the first open or unlocked position, the solar module 104 is permitted to slide relative to the solar module fastener 40 and each of the first and second clamping arms 32, 52 (FIGS. 7 and 8). In this manner, the lower surface 42b of the upper flange 42 of the solar module fastener 40 and the clamping surface 32k of the first clamping arm 32 are in a generally parallel relationship with one another. As can be appreciated, the angle at which the clamping surface 32k forms relative to the lower surface 42b of the solar module fastener 40, and therefore, the solar module 104 may be any angle at which the solar module 104 is permitted to freely translate relative to the solar module fastener 40 and the first clamping arm 32 (e.g., the angle does not need to be parallel to the solar module 104).

As the clamping fastener 70 is tightened, each of the flanges 32m, 52m (FIG. 1) are drawn towards one another causing each of the first and second clamping arms 32, 52 to rotate about the hinge pins 80a, 80b. As the first and second clamping arms 32, 52 are caused to rotate about the hinge pins 80a, 80b, the clamping surface 32k of the first clamping arm 32 is caused to form an angle relative to the lower surface 42b of the solar module fastener 40, and thereby the solar module 104, to wedge the solar module 104 between the clamping surface 32k and the lower surface 42b of the solar module fastener or otherwise inhibit movement of the solar module 104 relative to the clamping system 10 and the torque tube 102 (FIG. 9).

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A clamp assembly for use with a solar module, comprising:
    a first clamping arm operably coupled to a first portion of a solar module;
    a second clamping arm operably coupled to a second portion of the solar module, the second clamping arm operably coupled to the first clamping arm and disposed in juxtaposed relation thereto;
    an upper brace interposed between the first and second clamping arms, wherein the upper brace is rotatably coupled to each of the first and second clamping arms such that the first and second clamping arms may rotate relative thereto; and
    a fastener operably coupled to a respective portion of each of the first and second clamping arms,
    wherein the fastener is configured to draw each of the first and second clamping arms towards one another from a first, open position, where the solar module is free to move relative to the first and second clamping arms to a second, closed position, where the solar module is inhibited from moving relative to the first and second clamping arms.

2. The clamp assembly according to claim 1, wherein the first and second clamping arms are configured to receive a portion of a torque tube therebetween, wherein the first and second clamping arms are permitted to translate relative to the torque tube when in the first, open position, and are inhibited from translating relative to the torque tube when in the second, closed position.

3. The clamp assembly according to claim 1, further comprising a first solar module fastener operably coupled to the first clamping arm at a first end portion and operably coupled to a portion of the solar module at a second, opposite end portion.

4. The clamp assembly according to claim 3, wherein the solar module fastener defines a T-shaped profile having a flange defining opposed upper and lower surfaces and a stem disposed on the lower surface of the flange and extending perpendicularly therefrom, wherein the stem terminates at an end portion that is operably coupled to a portion of the first clamping arm.

5. The clamp assembly according to claim 4, wherein the lower surface of the flange is configured to abut a portion of the solar module and remain parallel therewith.

6. The clamp assembly according to claim 5, wherein the first clamping arm defines a clamping surface adjacent the first solar module fastener that is configured to selectively engage a portion of the solar module.

7. The clamp assembly according to claim 6, wherein when the first clamping arm is in the first, open position, the clamping surface of the first clamping arm is oriented such that the solar module is permitted to move relative to the first clamping arm.

8. The clamp assembly according to claim 7, wherein when the first clamping arm is in the second, closed position, the clamping surface of the first clamping arm forms an angle relative to the solar module such that the solar module is wedged between the lower surface of the flange of the solar module fastener and the clamping surface of the first clamping arm to inhibit movement of the solar module relative to the first clamping arm.

9. A clamp assembly for use with a solar module, comprising:
an upper brace defining an elongate member extending between first and second end portions;
a first clamping arm rotatably supported by the first end portion of the upper brace, a portion of the first clamping arm operably coupled to a first portion of a solar module;
a second clamping arm rotatably supported by the second end portion of the upper brace, a portion of the second clamping arm operably coupled to a second portion of the solar module; and
a fastener operably coupled to a respective portion of each of the first and second clamping arms,
wherein the fastener is configured to draw each of the first and second clamping arms towards one another from a first, open position, where the solar module is free to move relative to the first and second clamping arms to a second, closed position, where the solar module is inhibited from moving relative to the first and second clamping arms.

10. The clamp assembly according to claim 9, further comprising a first solar module fastener operably coupled to the first clamping arm at a first end portion and operably coupled to a portion of the solar module at a second, opposite end portion.

11. The clamp assembly according to claim 10, wherein the first solar module fastener defines a T-shaped profile having a flange defining opposed upper and lower surfaces and a stem disposed on the lower surface of the flange and extending perpendicularly therefrom, wherein the stem terminates at an end portion that is operably coupled to a portion of the first clamping arm.

12. The clamp assembly according to claim 11, wherein the end portion of the stem includes a cylindrical profile, the cylindrical profile of the end portion configured to be received in a corresponding bore defined through a portion of the first clamping arm such that the first solar module fastener is rotatably coupled to the first clamping arm.

13. The clamp assembly according to claim 10, further comprising a second solar module fastener operably coupled to the second clamping arm at a first end portion and operably coupled to a portion of the solar module at a second, opposite end portion.

14. The clamp assembly according to claim 13, wherein the first and second solar module fasteners cooperate to permit movement of the solar module relative to the first and second clamping arms when the first and second clamping arms are in the first, open position, and inhibit movement of the solar module relative to the first and second clamping arms when the first and second clamping arms are in the second, closed position.

\* \* \* \* \*